Feb. 6, 1951     T. C. SCHELLINGER     2,540,965
POWER TRANSMISSION, INCLUDING CUSHIONING CONTROL
FOR FRICTION DRIVE CONTROL MECHANISM THEREFOR
Filed March 5, 1948     3 Sheets-Sheet 1
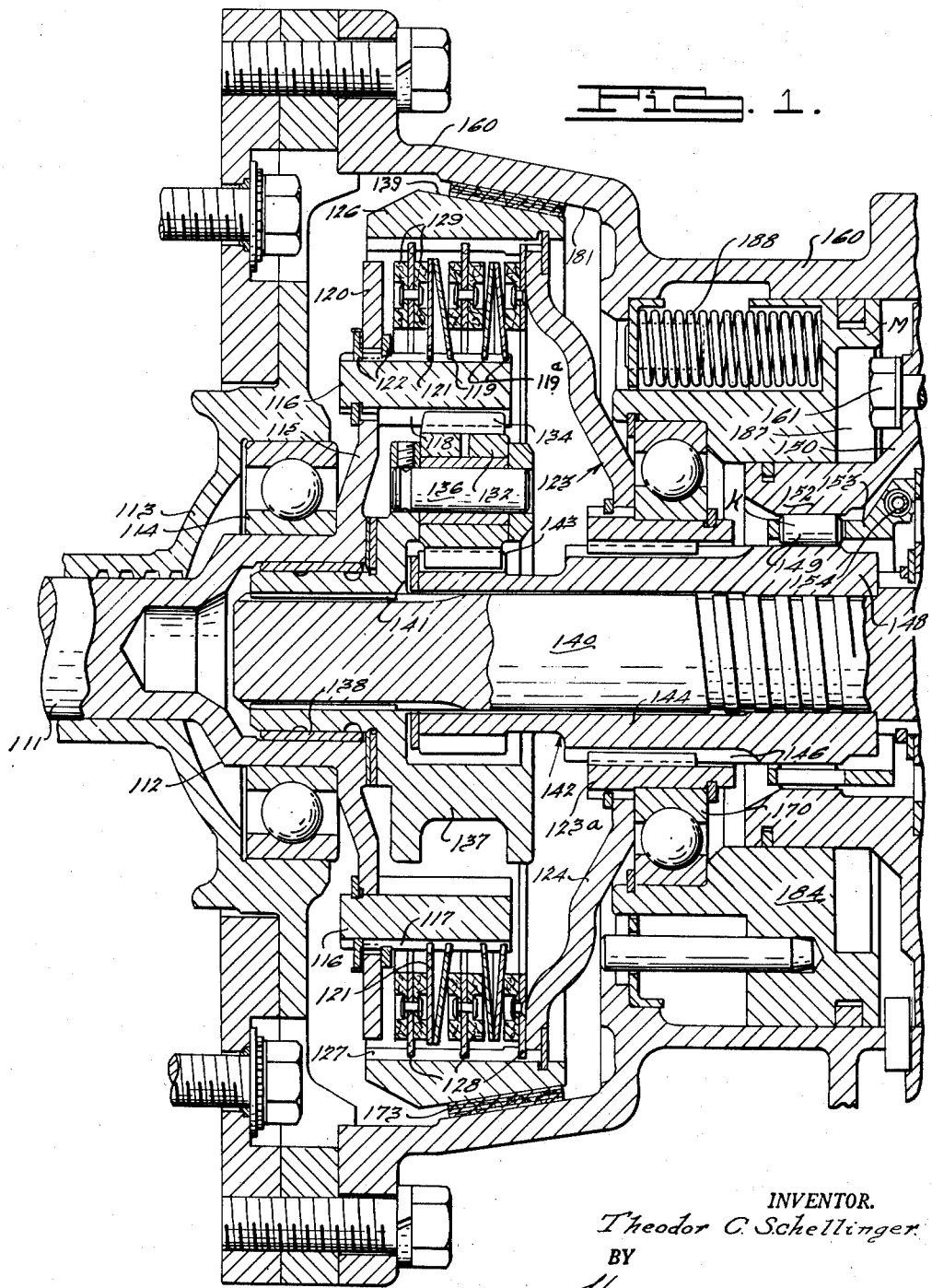
INVENTOR.
Theodor C. Schellinger
BY
Harris & Harris
ATTORNEYS.

Feb. 6, 1951 T. C. SCHELLINGER 2,540,965
POWER TRANSMISSION, INCLUDING CUSHIONING CONTROL
FOR FRICTION DRIVE CONTROL MECHANISM THEREFOR
Filed March 5, 1948 3 Sheets-Sheet 2
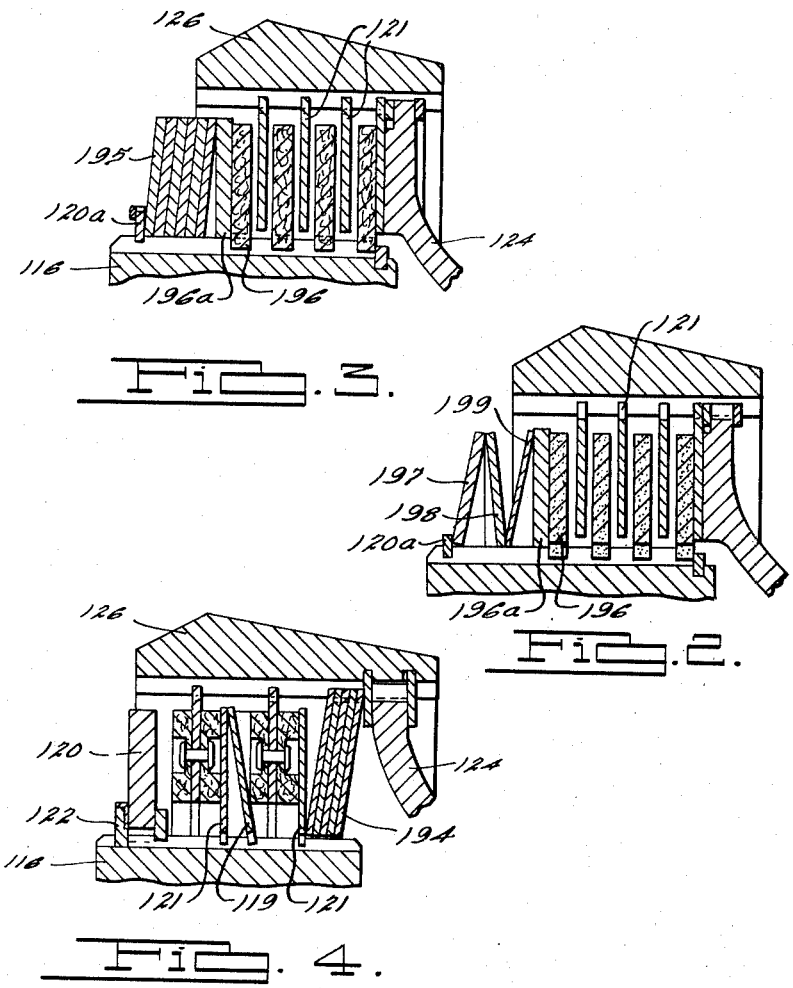
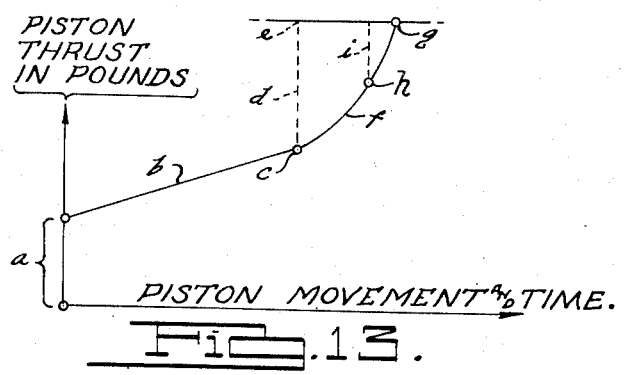
INVENTOR.
Theodor C. Schellinger
BY
Harness & Harris
ATTORNEYS.

Feb. 6, 1951     T. C. SCHELLINGER     2,540,965
POWER TRANSMISSION, INCLUDING CUSHIONING CONTROL
FOR FRICTION DRIVE CONTROL MECHANISM THEREFOR
Filed March 5, 1948     3 Sheets-Sheet 3
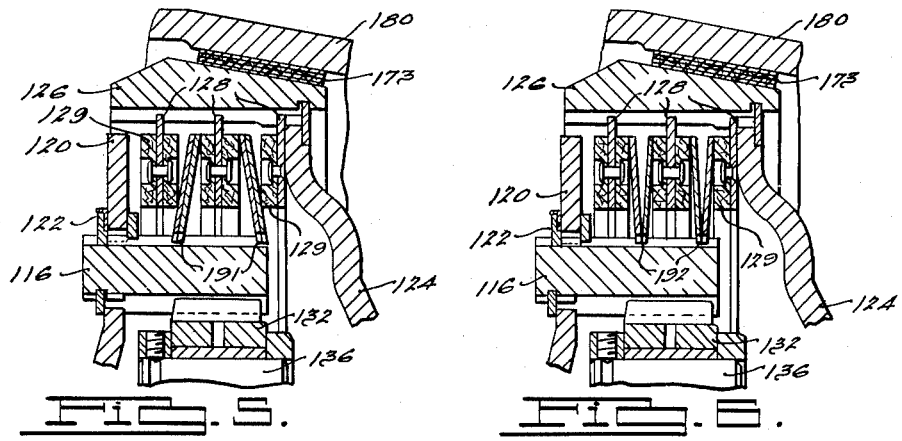
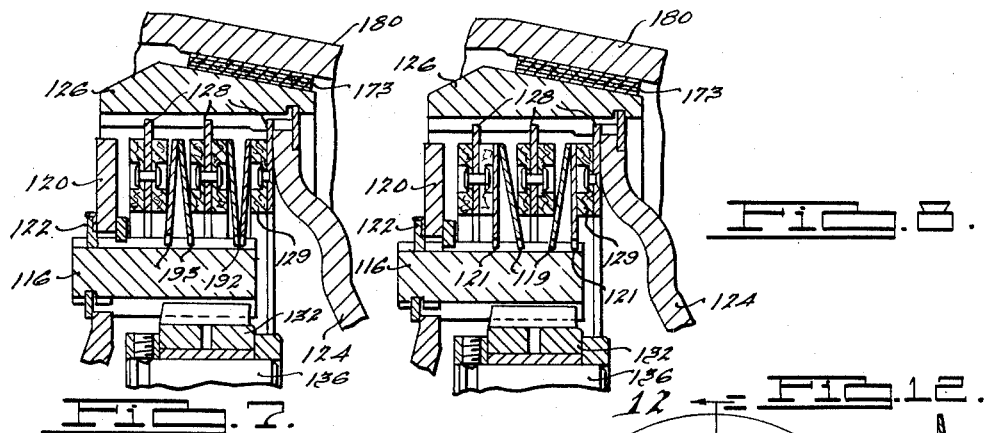
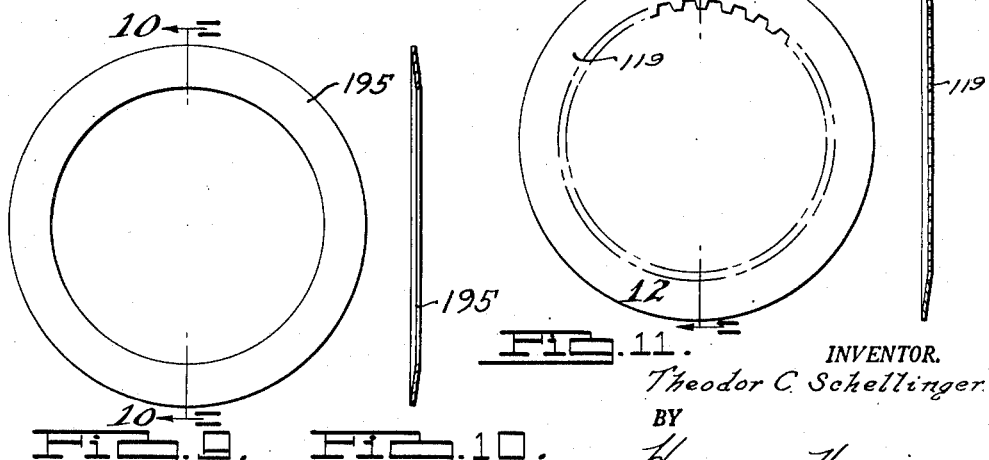
INVENTOR.
Theodor C. Schellinger
BY
Harness & Harris
ATTORNEYS Patented Feb. 6, 1951

2,540,965

UNITED STATES PATENT OFFICE 2,540,965

POWER TRANSMISSION, INCLUDING CUSHIONING CONTROL FOR FRICTION DRIVE CONTROL MECHANISM THEREFOR

Theodor C. Schellinger, Highland Park, Mich., assignor to Chrysler Corporation, Highland Park, Mich., a corporation of Delaware Application March 5, 1948, Serial No. 13,224

2 Claims. (Cl. 192—52)

This invention relates to power transmissions for automotive vehicles incorporating friction-type drive control means for effecting speed ratio drive changes, and particularly concerns mechanism for controlling the character of engagement of the drive control means.

With the development of automotive transmissions providing automatic speed changes, planetary gear mechanisms incorporating power-operated friction clutches for coupling together two elements of the planetary or power-operated friction brakes for holding one member thereof, have been suggested to effect the changes in speed ratio drive without the necessity of either releasing the main clutch of the vehicle, decelerating the engine, or interrupting the power flow of the engine as by ignition interruption. In either case it was desirable that the clutch or brake be of sufficient size to provide adequate torque transmitting or reaction surface to handle the torque to be transmitted and also compact enough to fit within the limited available space provided by a planetary mechanism. It was also desirable that such mechanism be simple in construction, economical to manufacture, and easy to install.

Plate or disc-type friction clutches and brakes have been found to be particularly satisfactory as drive control means for planetary gear mechanism and hence, for purposes of illustration only, my invention will be described as applied to a plate-type friction drive clutch control means of the type shown in the patent to Syrovy et al., 2,348,763, granted May 16, 1944, it being understood that the invention is also applicable to brake mechanism and is not necessarily limited in its application to planetary drive control means.

In operation of plate-type clutches and brakes heretofore suggested, engagement thereof is often found to be harsh and/or grabby under moderate throttle conditions and when making downshifts in the change speed mechanism to obtain greater acceleration. I have discovered that this undesirable condition may be materially alleviated, if not entirely avoided by providing a cushioned or feathered engagement of the friction drive control means such that the load is picked up gradually, or stated otherwise, the engine torque is applied gradually and not suddenly. In this connection I have discovered that if sufficient cushioning resistance is offered to engagement of the friction plates to substantially counteract or preferably substantially balance the pressure essential between these plates to enable them to transmit the torque or provide the necessary reaction for the applied load to be carried, the problem of undesired jerky or grabby engagement heretofore encountered may be completely solved. Moreover, I have found that a soft engagement of the friction members may be obtained by having this resistance gradually interposed.

It is, therefore, the principal object of my invention to provide a friction-type drive control mechanism with means for efficiently and smoothly controlling the torque and load assumption by the friction elements of the mechanism.

Another object is to provide a friction-type drive control mechanism operable as a clutch or brake wherein engagement of the friction drive control elements may be accomplished smoothly, quickly, and without harshness or grabbing of such elements.

A further object of my invention is to provide a friction-type drive control mechanism for automotive change speed means, the said mechanism providing for controlled cushioned engagement of the friction drive control elements to avoid jerky operation of the vehicle when making speed changes.

Still another object is to provide a friction drive control mechanism of the plate type with means effecting cushioned engagement of the plates, and wherein the cushioning is adequate to balance or exceed the clamping pressure between the friction power transmitting plates such that the torque which may be transmitted is sufficient to accommodate the imposed load.

An additional object is to provide a friction plate-type drive control mechanism with means for cushioning engagement of the friction drive transmitting or reaction plates and providing flexibility or resiliency in the engagement compensating for uneven or spot contacting of the friction plates.

Another object is to provide a friction plate-type drive control mechanism wherein certain of the friction drive control plates also provide for cushioning of the plate engagement.

A further object is to provide a friction drive control mechanism of the plate type wherein certain friction elements become fully engaged before others.

A specific object is to provide a friction drive control mechanism with cushioning means arranged as to be unaffected by heat dissipated by the friction members.

Another specific object is to provide a friction drive control mechanism of the plate type with means comprising a plurality of nested dished resilient spring-like plates for cushioning engagement of the friction members.

A further specific object is to provide a friction drive control mechanism of the plate type with one or more dished spring plates for cushioning engagement of the friction members.

Other objects and advantages of my invention will become apparent from the following description and the accompanying drawings wherein:

Fig. 1 is a sectional elevational view of a planetary change speed mechanism for an automotive vehicle showing my invention as applied to the plate clutch thereof;

Figs. 2, 3, 4, 5, 6, 7, and 8 are sectional elevational views of portions of a clutch mechanism similar to that of Fig. 1 showing modified arrangements for applying my invention;

Fig. 9 is a front elevational view of one of the dished plates shown in Figs. 2, 3, and 4 of the drawing;

Fig. 10 is a sectional view taken along the line 10—10 of Fig. 9;

Fig. 11 is a front elevational view of one of the dished clutch plates shown in Figs. 1, 5, 6, 7, and 8 of the drawings;

Fig. 12 is a sectional view taken on the line 12—12 of Fig. 11; and

Fig. 13 is a graph showing the relationship of piston thrust to movement thereof and/or time.

Referring to the drawings, Fig. 1 illustrates a planetary gear mechanism embodying one form of my invention in a friction clutch mechanism for locking the annulus and sun members of a planetary gear unit in a 1:1 drive. This construction comprises a driving shaft 111 having a bell-shaped rearwardly extending end portion 112 supported in a housing plate 113 by a bearing 114. The portion 112 carried a radially extending flange 115 having a toothed periphery adapted to mesh within internal teeth 118 of an annulus gear 116 mounted thereon. The annulus gear 116 has external splines or teeth 117 adapted to receive and interengage a plurality of internally splined metallic friction drive control driving plates which are arranged in pairs in Fig. 1.

The forward pair comprises a dished resilient, spring-like metallic plate 119 and a flat stiff plate 121 in contact with the concave side of the dished plate so as to initially contact the rim portion of plate 119. The rear pair comprises two dished resilient-spring-like plates 119a having their concave faces in face-to-face relationship so that their rim portions contact each other in the initial engagement of these plates.

A pressure reaction member in the form of a friction bearing plate or stop ring 120 is suitably held as by staking to the forward portion of the outer peripheral surface of the annulus 116 or may, as shown, be held by means of snap rings 122.

The aforesaid pairs of drive control plates are arranged between friction drive control driven clutch plates 128 of stiff character having friction facings 129 adjacent each of the friction members carried by the annulus. The two forwardmost plates 128 have friction facings 129 on each face while the rearmost plate 128 has a friction facing on its forward face only. The friction facings 129 may be of suitable clutch material, for example, metal, fabric, or a lubricant-impregnated metallic material such as "oilite."

A planetary carrier 137 is splined to the forward portion of a driven shaft 140 by splines 141. The hub of this carrier member is rotatably journalled within the bell-shaped rear end portion 112 of the drive shaft 111 in a bushing 138. The carrier 137 has a plurality of planet pinions 132 carried on spindles 136. The teeth 134 of the planet pinions 132 are meshed with the internal teeth 118 of the annulus gear 116 and also with teeth 143 of a sun gear 142 rotatably journalled on the driven shaft 140.

The sun gear 142 has a rearwardly extending enlarged portion 144 provided with external splines or teeth 146 adapted to slidably receive a throwout or pressure plate member generally designated by the numeral 123. The sun gear also has a rearward extension 148 provided with a smooth external periphery that forms the inner race of an overrunning brake mechanism K, the outer race of which is part of a stationary annular member 150 connected to the casing 160 by bolts 161. The outer race includes a series of circumferentially spaced cams 152 formed on the inner peripheral surface of the member 150.

The overrunning brake mechanism K is of conventional character and includes rollers 149 positioned between the smooth inner race 148 and the cams 152 of the outer race. The cams 152 cooperate with the rollers 149 and the surface 148 to permit the sun gear to overrun the member 150 in a counterclockwise direction of rotation looking forwardly while preventing overrunning between these parts in a clockwise direction. The rollers 149 are held in spaced relation by a carrier 153 and a suitable spring 154 is provided to urge the rollers 149 into locked up driving engagement with the inner race 148 and cams 152.

The clutch throwout member 123 includes an annular element 123a slidably splined to the sun gear portion 144, a spider member 124, a bearing 170 carried by the member 123a, and a fluid pressure motor piston 184 surrounding the bearing 170, all being movable together. A brake ring 126 having internal splines 127 is carried by and movable with the spider 124, the teeth 127 engaging in splineways provided in the external surface of the spider. The splines 127 are also engageable in splineways provided on the clutch elements 128 which are slidably supported on the splines 127.

The brake ring 126 has a frusto-conical shaped outer peripheral wall portion or surface 139 upon which is mounted a brake lining material 173. The lining 173 is adapted to engage the inner wall portion 181 of the casing 160 when the ring 126 is moved rearwardly by the clutch throwout member 123 and is moved forwardly by the piston 184 the brake ring will be released and the friction drive control mechanism will be engaged to drivingly connect the annulus 116 and the sun gear 143 to establish the planetary in a 1:1 ratio. When the throwout member 123 is shifted rearwardly and the brake 173 becomes engaged with the casing 160, rotation of the sun gear is resisted in either direction by the brake 173. If the drive is from the shaft 111 to the driven shaft 140 an underdrive or reduced speed ratio drive will be obtained from the planetary unit, the sun gear serving as the reaction member of the planetary unit and being held from reverse rotation by the roller brake K and by the friction brake 173. The brake 173 merely supplements the roller brake K. Under coast conditions of operation, however, with the brake 173 engaged, the shaft 140 becomes the driving member and the shaft 111 the driven member. In that event the brake 173 will become the reaction member for holding the sun gear from rotating forwardly, since the roller brake K will overrun. The planetary unit will transmit a two-way drive between the shafts 140 and 111 in an overspeed ratio.

A fluid motor M comprising the piston 184 movable in a cylinder 187 formed by the casing 160 and the annular member 150 and preferably hydraulically operated is provided to shift the throwout member 123 forwardly for clutching up the sun gear 143 and annulus 116 of the planetary. Release of the drive connection is obtained by venting of the fluid motor and rearward bias of the piston 184 by springs 188. Admission of fluid pressure to the cylinder 187 will cause the piston 184 to move forwardly and compress the springs 188. Simultaneously with movement of the piston 184 the throwout member 123 will move forwardly to disengage the brake 173 from the conical surface 181 of the casing thus disengaging this brake. Continued forward movement of the throwout member 123 will effect a forward movement of the friction drive control plates until slack between these plates is taken up whereupon they will become engaged for drivingly connecting the annulus with the sun gear to thereby transmit a direct drive through the planetary unit from the shaft 111 to the shaft 140. With the sun gear and annulus locked up there is no relative motion between the gearing of the planetary unit.

When the motor M is vented, the compression springs 188 will move the piston 184 rearwardly releasing the planetary clutch and effect engagement of the brake 173. If the drive is forwardly by the engine, the sun gear will be held from reverse rotation by the overrunning brake K and friction brake 173, the former assuming the greater load, and a reduced speed ratio drive will be transmitted through the planetary, the annulus 116 and planet pinions 132 rotating relative to the sun gear 142. The reduced speed ratio drive will be through the elements 111, 112, 115, 116, 118, 134, 137, and 140, the sun gear 142 being held from rotation.

In the control operation of the fluid pressure motor M some form of governor control valve may be provided (not shown) for effecting filling and venting of this motor at the proper predetermined vehicle speed.

Referring now to the various conditions that occur when the friction clutch of Fig. 1 is engaged, it will be observed that when pressure fluid is admitted to the cylinder 187 that the resistance of the springs 188 must first be overcome before any forward movement of the throwout member 123 may take place. Fig. 13 illustrates graphically what occurs during the forward movement of the piston 184. The graph there shown has as ordinates, piston thrust values in pounds and as abscissa movements of the piston and time. When fluid pump pressure is applied to the piston it first overcomes the resistance of the springs 188. The value of this force is represented by the ordinate $a$.

Piston 184 now begins to move forwardly, first breaking contact of the brake element 173 with respect to the casing 160 and then taking up the slack between the friction plates of the drive control mechanism. During this time a further compression of the springs 188 has occurred, this being represented by the line $b$ in the graph and the point at which contact of the friction plates takes place being represented by the letter $c$. Heretofore, where cushioning of the character provided by the present invention was not available no further movement of the piston took place and the pump immediately applied the necessary pressure to enable the plates to transmit the torque or provide the necessary reaction for the applied load. A sudden build-up in pressure between the plates hence occurred, this being represented by the dotted line $d$ in the graph, and the point at which load and piston thrust were equalized being represented by the point $e$. This sudden load assumption by the plates and the occurrence of spotty contact between plates because of inaccuracies are believed to account for the harsh and grabby character of engagement heretofore experienced. Also the jerky feeling transmitted to the rider during speed changes.

With the subject invention means are provided for gradually building up the applied pressure, the ideal arrangement being that where the applied pressure is built up to balance that pressure required for the applied load. The new result is accomplished by interposing additional resistance to the applied pressure and providing for further movement of the piston after engagement between the plates has initially occurred. The ideal action is represented in the graph by the curve $f$ and the load point corresponding to the point $e$ by the letter $g$.

In the present invention the means provided for accomplishing the foregoing result is one or more dished plates which may or may not themselves be friction drive transmitting or reaction taking plates. When such plates are interposed in the drive control mechanism further movement of the piston will be required to effect their flattening before full torque transmission or reaction may be provided. The action will be much like the interposing of a compression coil spring. During the time that compression of the dished members takes place slip will occur between the friction members and there will be a gradual assumption of the drive load. Manifestly once full engagement occurs, full torque may be transmitted or reaction taken and drive will take place in the transmission. Whatever resistance is interposed will serve to cushion the engagement of the friction drive control members. This resistance must of course, be of sufficient amount to produce a cushioning effect. In this connection it may be stated that conventional tabs employed in some plate clutches for merely separating the plates upon disengagement of the clutch do not offer the character of resistance satisfactory as a cushioning means. Obviously, the amount of cushioning will vary with the extent of resistance interposed to the forward movement of the clutch throwout member. As previously stated, the ideal condition is one where the resistance interposed is a value sufficient or exceeding that necessary to balance the pressure to be exerted between the friction plates for full torque or reaction assumption by the drive control means.

In the drawings various arrangements have been suggested for applying the subject invention. The results to be obtained will depend upon the location of the dished members, the degree of concavity and force value that may be employed in a given situation. Thus in the Fig. 1 arrangement the dished members are also employed as drive control members and the following action is believed to take place:

Assuming the dished plates to all be of the same thickness but the plate 119 to have twice the concavity of the plates 119$^a$ it will be noted that once all slack between the plates has been taken up (point C on the graph) continued movement of the piston 184 will start flattening of the dished members. The two dished plates 119$^a$ will flatten before the plate 119 for the reason that greater pressure is required to flatten the plate 119. Hence when the piston has moved forwardly about three quarters of the further allowable movement provided by the dished plates, the plates 119$^a$ will be substantially flat and full engagement between these plates and their adjacent driven plates 123 will have occurred. This takes place for example, at point $h$ on the graph of Fig. 13. Thereafter, continued movement of the piston will complete substantial flattening of the plate 119 and full engagement of all drive control members will have been affected by the time the piston reaches the point g. Note that a step-by-step engagement or cushioning takes place. Moreover, that the total cushioning pressure provided will be that equal to the force value of the plate 119.

If the dished plates 119 and 119a were to have the same force value and degree of concavity, all three would substantially fully engage at the same time and a step-by-step engagement would not occur. The engagement would then be smoother.

It will also be noted that in Fig. 1 the dished plate 119 contacts the outer rim of the plate 121 and the inner rim of the facing 129 of the adjacent plate 123 whereas the dished members 119a initially contact the inner rim of the facings 129. Consequently there is a tendency for the forward pair of plates to transmit greater torque upon initial engagement.

Figs. 5, 6, 7 and 8 show some of other possible arrangements of the dished friction drive control plates from which modified cushioning results will be obtained. In Fig. 5 each pair of plates 191 between the friction facings are dished and contact the outer rim of one friction facing 129 and the inner rim of the other. Each pair of dished plates are nested with each other such that the resistance offered to forward movement of the piston and consequently the cushioning effect will be the summation of the resistances of the separate dished members of the pairs. Thus assuming that the dished members 191 in this figure are all of the same thickness and degree of concavity, all will complete their flattening at the same time and the cushioning value will be that of one pair of plates. Note, however, that the initial torque transmitted by the dished members will be greater than that with the Fig. 1 arrangement since there are two areas of contact with the outer portion of the friction facings and two with the inner portion. In Fig. 1 there is only one outer area of contact. The arrangement in Fig. 6 discloses dished members 192 each having contact with the outer periphery of the friction facings. With this arrangement a higher initial torque will be transmitted assuming each of the dished members to have the same force value. The arrangement in Fig. 7 discloses one pair of dished members 192 arranged similar to those of Fig. 6, and one pair of plates 193 arranged similar to the plates 119a of Fig. 1. This arrangement effects a somewhat similar condition to that of Fig. 5 it providing two outer areas of contact with the friction facings and two inner. However, the cushioning effect here will be the value of only a single dished member assuming that each of the dished plates is of the same force value as those of Fig. 5. The arrangement in Fig. 8 provides a forward pair of plates 119—121 arranged similar to those in Fig. 1 and a second set of the same character but arranged in reverse order. This arrangement also gives two inner areas of initial contact and two outer areas of contact. However, the arrangement provides only half the piston movement before full engagement than that provided by the arrangement in Figs. 6 and 7 and less than that in Fig. 1 assuming that the dished members in all figures have the same force value and degree of concavity. However, by doubling the degree of concavity of the plates in Fig. 8 in the manner illustrated, the force value may be increased to provide greater cushioning and the forward movement of the piston required for full engagement may also be made equal to that in Figs. 6 and 7 to provide a more gradual application of this greater cushioning force.

The several embodiments shown in Figs. 1, 5, 6, 7, and 8 will provide substantial cushioning, each however providing a somewhat different shape to the curve f in the graph of Fig. 13. In actual operation it has been found that in certain cases there may be practical disadvantages to the foregoing constructions in that heavy dished plates or increasing numbers of nested plates may be required to obtain ideal cushioning, that is, obtain sufficient piston movement and force value as to reach the point g in the graph. Hence in some cases it may be necessary to accept a lesser force value and permit cushioning to cease at the point h allowing a sudden pressure build-up represented by the dotted line i. Moreover, there is a tendency to wear the friction facings 129 at their inner and/or outer areas more rapidly than the portions therebetween, this being especially true where the dished members are of substantial force value, that is to say, are heavy plates. Furthermore, the heat developed during engagement of the drive control mechanism may have a dilatory effect on the temper of the dished members in service.

I have found that ideal performance may be obtained by providing a nested group of dished members which preferably in and of themselves do not transmit any torque whatever and which may, as shown in Figs. 2, 3, and 4 be journalled on the ring member 116 and be positioned in contact with an endmost friction drive control member 196 or 121 or a washer 196a. Thus in Fig. 3, five dished members are arranged in nested formation and journalled on the ring member 116 but not drivingly connected thereto, these plates being identified by the numeral 195. Torque is transmitted through the friction drive control members 196 which are illustrated in Fig. 3 to be of a lubricant-impregnated metallic material such as oilite, these plates being keyed to the ring 116. The driven friction drive control members may be metallic elements similar to the plates 121 of the previously described constructions and are keyed to the ring 126. This arrangement has the advantage of providing greater cushioning effect since the force value provided is five times that of a single dished member 195. In this manner it becomes possible in most situations to provide smooth cushioning to the point g in the graph representing the pressure necessary to accomplish full torque transmission between the friction drive control members.

The arrangement in Fig. 4 is shown in connection with friction drive control members of the types in Figs. 1, 5, 6, 7, and 8. Here again a cushioning effect similar to that of the arrangement in Fig. 3 may be obtained. The difference in this construction is that the dished cushioning members 194 are keyed to the ring member 126. Moreover, one pair of friction drive control members 119, 121 keyed to the annulus 116 are similar to the forward pair in Fig. 8. The single dished member of this pair will provide added cushioning value and greater piston movement before full engagement of the clutch occurs. The cushioning will be of the step-by-step character previously mentioned.

The arrangement disclosed in Fig. 2 is my preferred form of cushioning control construction. This arrangement avoids all of the disadvantages of the constructions in Figs. 1, 5, 6, 7, and 8 previously mentioned, may provide the full force value or cushioning effect of the arrangement in Figs. 3 and 4, and in addition provides maximum piston movement for full engagement so that a softer more gradual cushioning is possible. In this figure the dished cushioning plates are arranged with the concave sides of the forwardmost pair of plates 197, 198 opposing each other whereas the convex sides of the rearward two plates 198, 199 oppose each other. The drive control arrangement is similar to that of Fig. 3 although not limited thereto. By preference each of the dished plates 197, 198, 199 has a different force value. Thus, for example, assuming that the pressure required between the friction drive control members 121, 196 for obtaining the necessary torque transmission upon full engagement is 496 lbs., that is, the pressure value at point g in the graph, I would provide the rearwardmost dished plate 199 with a force value of 110 lbs., the middle dished plate 198 with a force value of 330 lbs., and the forwardmost plate 197 with a force value of 496 lbs. The forward movement of the piston necessary to obtain full clutch engagement from the beginning of compression of the members 197, 198, 199 would be the summation of the concavity of all of these dished members. During this movement the cushioning value would gradually build up from the point c on the graph to the point g representing 496 lbs. The 110 pound member 199 would become completely flattened first, the 330 pound plate 198 second, and the 496 pound plate 197 last. As already stated, this arrangement will develop a combined load or force value of 496 lbs. when the assembly is fully compressed. The greater the concavity of the plates the more uniform and gradual will be the cushioning effect. This arrangement permits a soft uniformly increasing cushioning pressure to be applied substantially eliminating all harshness and grabbing in the friction drive control plate engagement as well as jerky shifts in a transmission in which the device is employed. The action may be represented by a smooth curve between the points c and g of the graph. The described arrangement also provides a resiliency adapted to compensate for spotty contact between the friction drive control plates.

From the foregoing description of my invention, it will be seen that I have provided a simple and desirable construction for eliminating harsh and grabby clutch engagement as well as jerky car operation when making speed ratio changes in an automotive transmission. It will be observed that the disclosed constructions are of simple character and well adapted for carrying out the purposes of the subject invention. It will also be understood that although I have disclosed various arrangements capable of providing the features of my invention in one or more capacities, it will be understood that various other modifications, changes, and substitutions may be made without departing from the spirit of my invention. Thus the illustrated embodiments show my invention as applied to a friction clutch mechanism for example, for planetary gearing. It will be understood that the invention has equal application to a brake mechanism, for example, for holding one of the elements of a planetary gearing. Moreover, modified cushioning effects may be obtained by employing in the friction drive control structure friction facings on certain members of different coefficient of friction from those used on others. For example, some facings could be of oilite and others of cotton fabric. The subject invention is, therefore, to be construed to include all such modifications, changes and substitutions as may come within the scope of the following claims.

I claim:

1. In a change speed mechanism having normally drivingly disengaged friction drive control plates engageable for effecting a drive change in the mechanism, means movable for compacting said plates and applying thereto a predetermined maximum pressure for sustaining without release the torque to be transmitted by said mechanism and which pressure is substantially greater than the pressure necessary to compact said plates, a fixed reaction member, and independent non-driving cushioning means coaxial with said friction plates and movable member and operably arranged between said movable member and reaction member, for controlling the load assuming characteristics of said torque transmitting plates, said cushioning means comprising dished flexible plate means resiliently opposing said movable member, said dished means having the physical characteristics of offering variable resistance to pressure applied thereto and of providing sufficient deformation by flexure before flattening to facilitate additional movement of said movable member following full compacting of said friction drive control plates, the said movement continuing until said maximum pressure application is sustained by said friction drive control plates, said cushioning means resisting said movable means at its position of maximum pressure application with a force substantially equal to said maximum pressure.

2. A change speed mechanism as claimed in claim 1 wherein said cushioning means comprises a plurality of dished resilient plates of different force value arranged in series with said friction drive control plates and having their similar end faces in face to face relationship.

THEODOR C. SCHELLINGER.

REFERENCES CITED

The following references are of record in the file of this patent:

UNITED STATES PATENTS

| Number | Name | Date |
| --- | --- | --- |
| 923,613 | Atwood | June 1, 1909 |
| 1,632,526 | Willgoos | June 14, 1927 |
| 1,802,630 | Cotal | Apr. 28, 1931 |
| 1,855,937 | Callsen | Apr. 26, 1932 |
| 1,958,070 | Schmid et al. | May 8, 1934 |
| 2,046,453 | Havill et al. | July 7, 1936 |
| 2,136,971 | Fleischel | Nov. 15, 1938 |
| 2,193,524 | Thompson | Mar. 12, 1940 |
| 2,253,284 | Bertrand | Aug. 19, 1941 |
| 2,318,481 | Greenlee et al. | May 4, 1943 |
| 2,349,410 | De Normanville | May 23, 1944 |
| 2,376,799 | Miller | May 22, 1945 |

FOREIGN PATENTS

| Number | Country | Date |
| --- | --- | --- |
| 7,848 | Great Britain | Apr. 2, 1906 |
| 99,315 | Australia | Feb. 25, 1925 |
| 294,825 | Italy | Apr. 5, 1932 |
| 384,788 | France | Feb. 14, 1909 |
| 447,886 | Great Britain | May 27, 1936 |
| 646,120 | Germany | June 8, 1937 |
| 800,694 | France | July 16, 1936 |